Aug. 17, 1954 G. J. PISTEY 2,686,378
STEAM IRON VALVE AND LATCH
Filed April 21, 1950 2 Sheets-Sheet 1
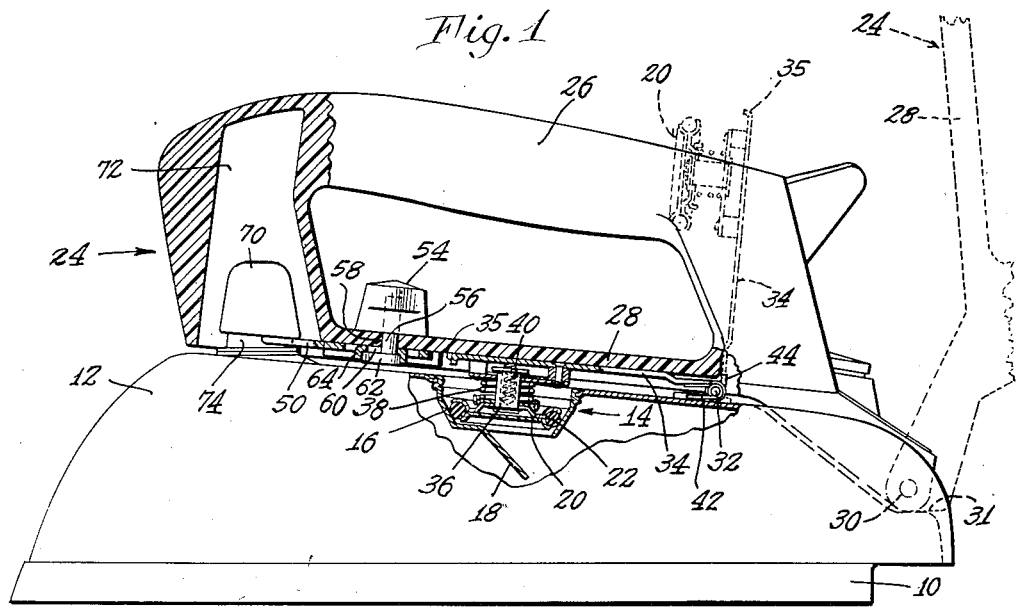
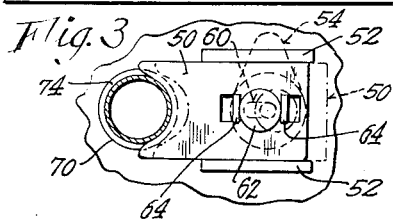
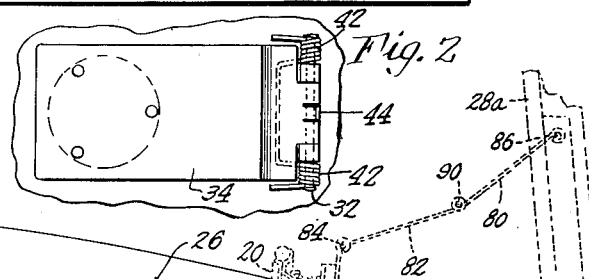
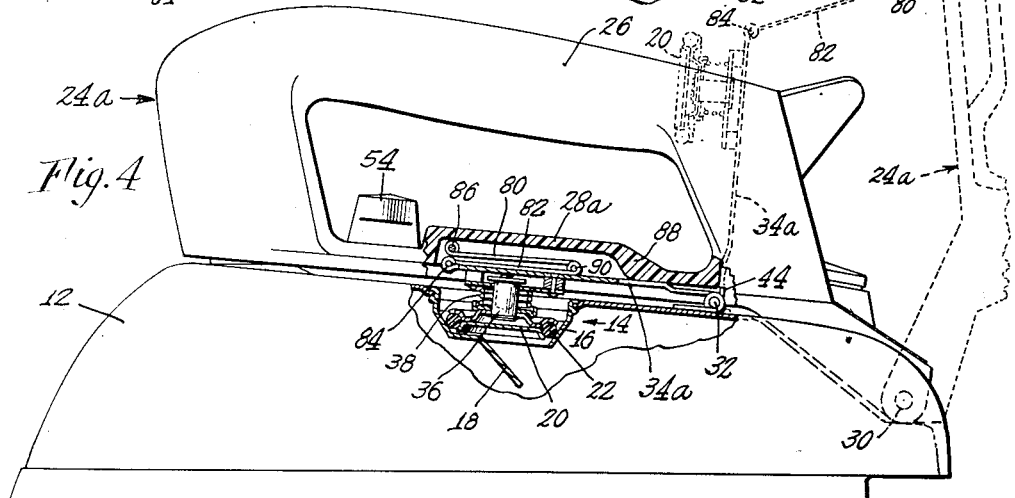
Inventor
George J. Pistey
By
Johnson and Kline
Attorneys Aug. 17, 1954  G. J. PISTEY  2,686,378
STEAM IRON VALVE AND LATCH
Filed April 21, 1950  2 Sheets-Sheet 2

Inventor
George J. Pistey
By
Johnson and Kline
Attorneys

Patented Aug. 17, 1954

2,686,378

UNITED STATES PATENT OFFICE 2,686,378

STEAM IRON VALVE AND LATCH

George J. Pistey, Stratford, Conn., assignor to Casco Products Corporation, Bridgeport, Conn., a corporation of Connecticut Application April 21, 1950, Serial No. 157,226

15 Claims. (Cl. 38—77)

This invention relates to steam-electric flat irons, and particularly to steam-electric irons of the type having an upper filling opening which is closed by a valve, and in which the valve is disposed beneath a movable latched valve-retaining and hand guard plate.

In irons of this type it has been the practice to mount the valve resiliently on the guard plate so as to be urged into sealing relation with the margins of the opening when the guard plate is latched down over the opening, and to be removed to uncover the opening when the guard plate is moved away. Such mounting of the valve is usually satisfactory if the guard plate is of sheet metal. However, if the guard plate should be made of plastic or other soft material to reduce heat transmission, it becomes difficult if not impossible to form a firm mounting connection for the valve which will be durable for long periods of use.

It is an object of this invention therefore to provide a structure in which the guard plate may be cast from heat insulating plastic material such as that normally used in forming the handle of the iron, preferably as an integral part of an assembly which includes the handle, and in which the valve, while being urged into and held in sealing position by said guard plate, is still independently mounted on the iron and hence has a sturdier mounting than could be obtained by connecting the valve directly to the plastic material of the guard plate.

It is another object of the invention to provide a mounting for the valve such that the valve will be automatically removed from the filling opening in response to lifting of the guard plate, and in one form of the invention it is a further object to provide a delayed action operation whereby the uncovering of the filler opening takes place a short interval after sealing pressure of the valve is first released to permit any slight accumulation of steam pressure to bleed off gradually and thus avoid any tendency to forceful ejectment of hot steam or water droplets when the valve is actually lifted away from the opening.

A further object of the invention is to provide a convenient latch means for holding the guard plate in valve-retaining position, and to arrange the same for economical production together with suitable features for mounting on a guard plate of molded plastic material.

A still further object of the invention is to adapt other conventional portions of the iron to serve additionally as a portion of the novel latch means without extensive modification from their ordinary form.

Additional features and advantages will hereinafter appear.

In the accompanying drawing:

Figure 1 is an elevation of the iron according to this invention, parts being shown in section, and the raised position of the handle and valve being illustrated in broken lines.

Fig. 2 is a detail view in top plan of the valve support member of the device of Fig. 1.

Fig. 3 is a detail view in bottom plan of the latch mechanism shown in Fig. 1, parts being shown in section.

Fig. 4 is an elevation of the iron according to this invention, parts being shown in section, in which is illustrated a modified form of the valve support means, the open raised position of the handle and valve being shown in broken lines.

Figure 5:
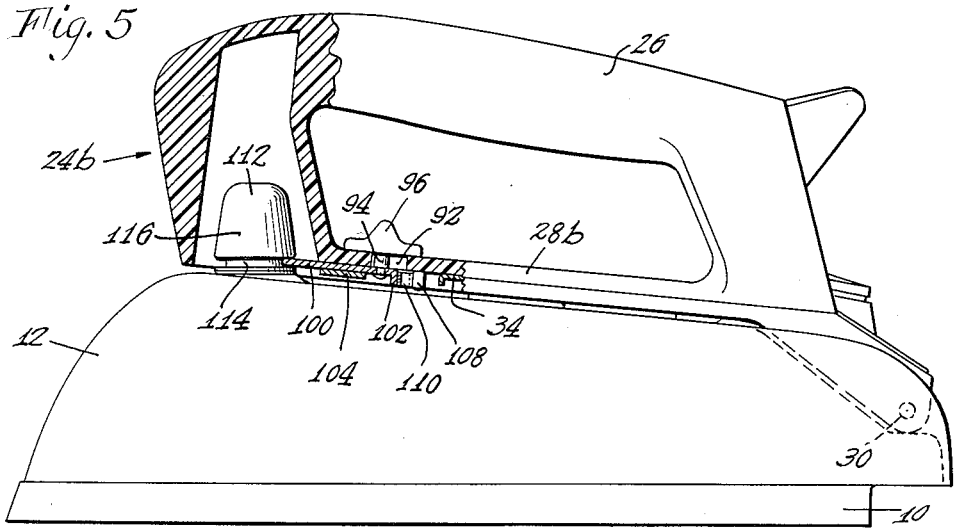
Fig. 5 is an elevation partially in section illustrating a modified form of the latch mechanism.

The iron of this invention as illustrated in Fig. 1 includes a sole plate 10 having steam passages (not shown) for applying steam generated by the iron to the work. Above and on the sole plate is mounted the boiler 12 in which the steam is generated, and which has communication with the above-mentioned sole plate openings. The sole plate 10 and boiler 12 form the major part of that portion of the iron hereinafter referred to as the "base," as distinguished from the relatively movable handle assembly. In the upper surface of the boiler is formed a filler opening 14 in which is mounted the funnel element 16 which carries an integral baffle member 18. The opening 14 is closed by means of a valve member 20 which has a resilient peripheral ring 22 of rubber-like material for sealing contact with the inner surface of the funnel element 16.

Movably mounted on the framework of the iron is a handle assembly 24 which includes a handle member 26 and a guard plate 28. The handle assembly is movable between a position overlying and covering the filler opening as shown in solid lines in Fig. 1, and a position in which it is removed from such overlying relationship, stands approximately vertical, and permits access to the filler opening 14 as shown in dotted lines in Fig. 1. Preferably the movable mounting for the handle assembly 24 consists of a pivotal connection with the base of the iron such as that shown by reference character 30 in Fig. 1, the handle assembly 24 being moved between the aforesaid positions by a swinging movement about said pivot. Stop means 31, formed on the handle assembly, is arranged to strike a convenient portion of the base of the iron and prevent excessive swinging of the handle assembly away from its normal position overlying the boiler. As further illustrated in Fig. 1, the handle assembly including guard plate 28 is preferably molded as an integral member using a suitable heat insulating plastic composition.

Hinged to the top of the boiler 12, for example by a hinge pin 32, is the valve supporting plate 34 preferably of sheet metal. The valve 20 is resiliently mounted near the free end of the support 34 by means of a post 36 and springs 38 and 40. A light spring 42 surrounds the pin 32 and hinges the valve support 34 towards raised position. A stop member 44 formed on the support member 34 adjacent the hinge strikes the top of the boiler 12 when the member 34 has reached the dotted line position of Fig. 1 and prevents swinging opening movement of the member 34 any further to the right.

The arrangement of the valve support member 34 is such that when depressed to the point where ring 22 of the valve 20 first strikes the funnel member 16 the support 34 extends slightly above the position in Fig. 1, and as the same is further depressed the springs 40 and 38 are compressively deformed to urge the valve 20 into sealing engagement with the funnel member 16. This action is brought about by the guard plate 28 as the handle assembly 24 is lowered into the final position shown in solid lines in Fig. 1. As the handle member reaches its lowermost position, it is latched firmly in place to hold the parts in the position shown in Fig. 1.

For the purpose of holding the handle member in the solid line position of Fig. 1, there is provided a sheet metal latch member 50 which is mounted for sliding movement between the integrally molded guides 52 formed on the bottom of guard plate 28 in the forward portion thereof. A turning button 54 is suitably located at the top of the plate 28 for ready manipulation and has a shaft 56 passing through an opening 58 in the guard plate 28 and through the slot 60 in the latch 50. At the lower end of the shaft is an eccentric 62 which underlies the latch 50 and retains it in contact with the underside of the guard plate 28. A pair of followers 64 are lanced from the material of the latch, and by their contact with the eccentric 62 cause the latch to slide back and forth between the guards 52 in response to the turning of the button 54. The extreme positions of the latch 50 are illustrated by the solid lines and the dot and dash lines in Fig. 3.

The boiler of a steam iron is normally equipped with a vertical standpipe (not shown) which projects through the top of the boiler and into a hollow portion of the handle and is covered by a dome securely fastened to the flat upper surface of the boiler as by threading the same into a threaded opening in the boiler, said dome also extending within said hollow of the handle portion. This arrangement of parts serves to conduct steam from the boiler proper to the sole plate passages and acts as a trap to inhibit moisture droplets from taking the same course. In accordance with the present invention such a dome 70 is provided within the recess 72 of the handle assembly 24. The dome 70 is slightly modified in shape to include undercut portion 74 properly located to receive the forward end of the latch 50 when the same is extended and in its lowermost position, and thus hold the handle assembly 24 and guard plate 28 in position to retain the valve support 34 and valve 20 in sealing position with respect to the filler opening 14.

When it is desired to fill the iron of Figs. 1 to 3 the button 54 may be turned to retract the latch 50 from the undercut portion 74 of the dome 70 whereupon the handle member 24 of the valve support 34 raises slightly in response to the action of the valve operating springs 38 and 40. When the handle 26 is grasped and the handle member 24 swung upwardly to the dotted line position of Fig. 1, the valve support member 34 swings upwardly automatically in response to the urging of the light spring 42 and assumes the position shown in dotted lines of Fig. 1, whereupon the boiler can be readily filled through the opening 14. To place the iron in condition for use it is necessary merely to grasp the handle 26 and swing the handle assembly 24 downwardly about the pivot 30 until it strikes the upper end of valve support member 34. Preferably this end of the valve support member is downwardly curved as shown by reference character 35 to provide a point of smooth engagement with the undersurface of the guard plate 28 of handle member 24. Further downward swinging of the handle member carries the valve support with it, and finally positions the valve in contact with the funnel member 16, thus closing off the filler opening 14. At this point the handle member has not yet been forced home but still stands in slightly raised position. Further downward movement of the handle member compresses the valve springs 38, 40 to provide sealing pressure for the valve and finally brings the handle member into position such that rotation of the button 54 and eccentric 62 extends the latch 50 into the undercut portion 74 under the ledge of the dome 70 to retain the parts in place. When sufficient heat has been applied to the filled boiler through the usual electric sole plate coil, the device will be ready for use as a steam iron.

Fig. 4 illustrates a modification of the invention similar in many respects to that of Fig. 1, and where the parts are the same, the same reference characters have been used. However, instead of the spring 42 which lifts the valve support 34 in Fig. 1, there has been provided in the modification of Fig. 4 a valve support 34a which is mechanically connected to the guard plate 28a on the handle assembly 24a. This connection preferably consists of a pair of pivotally connected links 80 and 82, one end of the pair being connected by a pivot pin 84 to the free end of the valve support 34a, and the other end by a pivot pin 86 to the guard plate 28a. The intermediate pivot between the links 80 and 82 is indicated by reference numeral 90. Preferably the guard plate 28a also includes a slightly raised portion 88 which forms a housing for the links 80 and 82 when in folded position shown in solid lines in Fig. 4.

When the button 54 is turned to unlatch the handle assembly 24a in the manner previously described, the handle 26 is grasped and the handle assembly 24a is pivoted about the pivots 30 into the raised position shown in dotted lines in Fig. 4. During the initial portion of this movement, the pressure is released from the valve support 34a and the same is allowed to raise slightly in response to the action of the springs 38 and 40. During the second portion of the handle assembly movement the links 80 and 82 pivot and straighten out with no corresponding movement for the valve support 34a, thus providing a delayed action connection between the handle and the valve. When the handle assembly has reached a position which is about one-third of its complete angle of swing, the links 80 and 82 have become completely extended, and thereafter, in response to further swinging of the handle assembly, the valve support 34a is raised by the links until such time as the handle and valve support attain the positions shown in dotted lines in Fig. 4. Preferably one or more of the pivots 84 or 86, or the intermediate pivot 90 in the linkage system, is provided with stop means to prevent straightening of the linkage beyond the position shown in dotted lines, and thus prevent folding of the linkage in the wrong direction and insure proper folding of the linkage in the housing 88 when the handle assembly is again returned to lowered position.

The arrangement above described provides for a momentary delay between release of the sealing pressure on the valve, and movement of the valve away from the orifice. In this way, if a slight steam pressure should be present in the iron at the time of opening, the release of sealing pressure on the valve would allow the steam pressure to bleed off and dissipate itself in a gentle manner, at the same time retaining the valve in covering relationships to the filling opening whereby forceful ejectment of any hot water droplets or hot vapor is prevented. By the time the valve lifts away from the opening after straightening of the linkage 80, 82, the force of the steam, if any, will be substantially expended and possible discomfort to the user of the iron in this connection will thus be precluded.

In previous irons of generally similar structure it has been a frequent practice to construct the guard plate, corresponding to plate 28 or 28a of this application, of sheet metal, whereby it serves as a convenient and suitable mounting point for a valve such as valve 20 and its resilient urging means. However, in cases where the handle and guard plate are to be integrally molded from plastic material, as illustrated in the attached drawing, in order to improve the heat resistance of the guard plate and the overall appearance of the iron, the plastic guard plate does not provide the most desirable anchorage point for a working and load-carrying device such as the valve 20. The devices illustrated in Figs. 1, 2 and 4 provide a suitable mounting for the valve whereby the advantages of an integral molded plastic handle assembly can be obtained, the valve can still be operated by the handle assembly movement, and the disadvantages, from the standpoint of strength and durability, of direct mounting of the valve on a plastic guard plate can be avoided.

Figure 6:
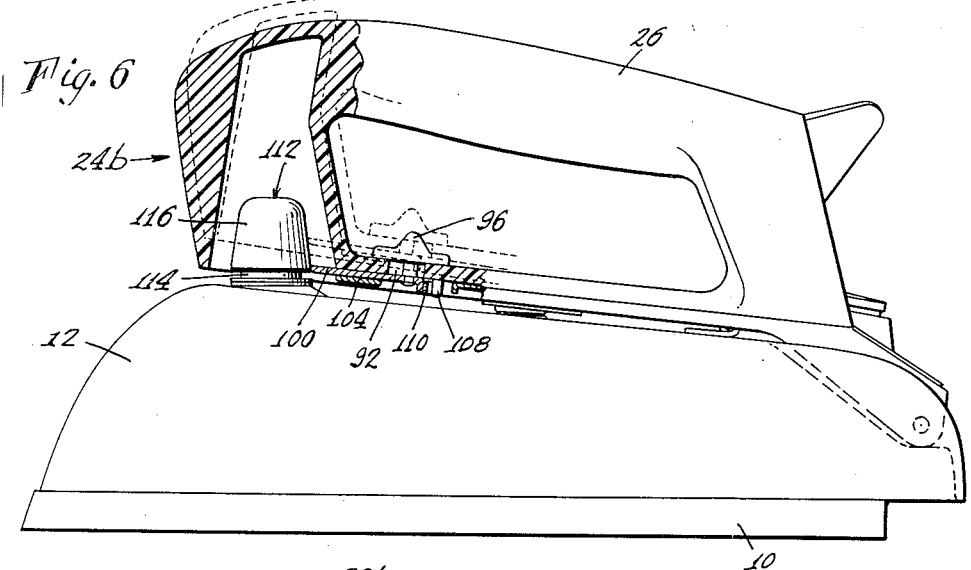
Fig. 6 is a view similar to Fig. 5 showing the parts with the latch released and the handle in slightly raised position.
Figure 7:
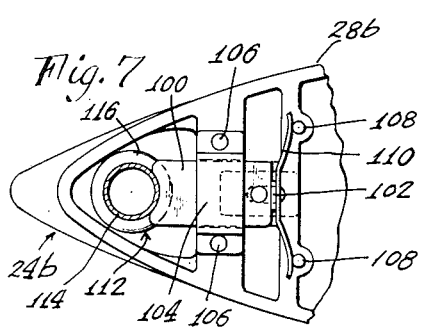
Fig. 7 is a detail view in bottom plan of the latch mechanism shown in Figs. 5 and 6, parts being shown in section.

Figs. 5 to 7 illustrate an iron provided with an alternative form of latch mechanism which may be employed if desired in place of the latch mechanism 50 to 64 of Figs. 1 and 3. In the form of the invention shown in Figs. 5 to 7 the guard plate designated by reference character 28b includes a slot 92 which slidably receives the restricted portion 94 of a sliding operating button 96. The lower end of the button is rigidly connected to a sliding latch 100 made of sheet metal and including a turned down ear 102 at its rear end. The latch 100 is preferably retained against the lower side of the guard plate 28b by means of a sheet metal guide strip 104 which is firmly secured to plate 28b by rivets or the like 106. Abutment pins 108 are firmly anchored in the guard plate 28b, and between the pins 108 and ear 102 is mounted a leaf spring 110 for urging the latch 100 towards the left as shown in Figs 5 and 6. The spring 110 may be retained in place in any suitable manner but is preferably attached by spot welding to the ear 102 on the latch 100. For cooperation with the latch 100 there is provided a dome 112 somewhat in shape similar to the dome 70 of Fig. 1 having an undercut portion 114 which receives the latch 100 when the handle 24b is in fully lowered position. The surface 116 of the dome 112, above the undercut 104, has an upwardly tapered configuration such that the end of the latch 100, when the same is in its forwardmost position as determined by the dimension of the slot 92, will strike on the tapered surface portion 116 at some point during its downwardly swinging motion. As illustrated in Fig. 6, forcing the handle assembly 24b downwardly from the dotted line position to the full line position in said figure, automatically retracts the latch 100, and when the handle is finally forced home the spring 110 will force the latch 100 into the undercut 114 on the dome 112, and the handle assembly will thenceforth be retained in its lowered position until such time as the latch is released by rearward movement of the button 96. The latch mechanism of Figs. 5 to 7 is somewhat more convenient than that of Figs. 1 to 3 in that its latching operation, upon descending movement of the handle assembly, is automatic and engagement of the operating button for operation of the latch is only required to effect releasing movement thereof.

While the latch of Figs. 5 to 7 is shown on an iron which incorporates the valve support structure of Fig. 1, it will be readily appreciated that the same is entirely consistent with the linkage operated valve support structure of Fig. 4, and may be readily incorporated in the same iron with the linkage-operated type of valve support structure if desired.

The latches of Figs. 1 and 5 are similar in that both of them employ a portion of the conventional standpipe dome, with very slight modification, as one element of the latch means. Furthermore both are particularly adapted for firm and durable attachment to a plastic guard plate, merely requiring a flat surface for sliding engagement of the latch with the bottom surface of the plastic plate and an opening or slot through the plate for receiving the reduced neck portion of the operating button.

Variations and modifications may be made within the scope of the claims and portions of the improvements may be used without others.

I claim:

1. In a steam iron having a base including a sole plate and a boiler mounted above the sole plate, said boiler having an upper filler opening; a handle assembly including a guard plate movably mounted on said base to move between a first position overlying said opening in which the same is covered by said guard plate, and a second position remote from said opening to expose the same for filling; a valve cooperable with said opening for sealing the same; the improvement which comprises means distinct from said guard plate for mounting said valve on said base for movement between a first position in which said valve closes said opening, and a second position in which the valve is removed from said opening to permit filling access thereto; and means connected with the handle assembly and valve, automatically moving said valve to its first position in response to movement of said handle assembly to its first position, and for moving said valve to its second position when said handle assembly is moved to its second position.

2. In a steam iron having a base including a sole plate and a boiler mounted above the sole plate, said boiler having an upper filler opening; a handle assembly including a guard plate movably mounted on said base to move between a first position overlying said opening in which the same is covered by said guard plate, and a second position remote from said opening to expose the same for filling; a valve cooperable with said opening for sealing the same; the improvement which comprises means distinct from said guard plate for mounting said valve on said base for movement between a first position in which said valve closes said opening, and a second position in which the valve is removed from said opening to permit filling access thereto; and positive means connected with the handle assembly and valve, automatically moving said valve to its first position in response to movement of said handle assembly to its first position, and for moving said valve to its second position when said handle assembly is moved to its second position.

3. In a steam iron having a base including a sole plate and a boiler mounted above the sole plate, said boiler having an upper filler opening; a handle assembly including a guard plate movably mounted on said base to move between a first position overlying said opening in which the same is covered by said guard plate, and a second position remote from said opening to expose the same for filling; a valve cooperable with said opening for sealing the same; the improvement which comprises means distinct from said guard plate for mounting said valve on said base for swinging movement between a first position in which said valve closes said opening, and a second position in which the valve is removed from said opening to permit filling access thereto; and means comprising linkages between and connected to the guard plate and valve for automatically moving said valve to its first position in response to movement of said handle assembly to its first position, and for moving said valve to its second position when said handle assembly is moved to its second position.

4. In a steam iron having a base including a sole plate and a boiler mounted above the sole plate, said boiler having an upper filler opening; a handle assembly including a guard plate movably mounted on said base to move between a first position overlying said opening in which the same is covered by said guard plate, and a second position remote from said opening to expose the same for filling; a valve cooperable with said opening for sealing the same; the improvement which comprises a plate separate from said guard plate, pivotally mounted at one end on the upper surface of said base and carrying said valve near the other end, and movable about its pivot between a first position in which the plate lies against said base and the valve closes said opening, and a second position in which the valve is swung upwardly away from said base; and means connected with the handle assembly and valve, automatically moving said plate to its first position in response to movement of said handle assembly to its first position, and for moving said plate to its second position when said handle assembly is moved to its second position.

5. In a steam iron having a base including a sole plate and a boiler mounted above the sole plate, said boiler having an upper filler opening; a handle assembly including a guard plate movably mounted on said base to move between a first position overlying said opening in which the same is covered by said guard plate, and a second position remote from said opening to expose the same for filling; a valve cooperable with said opening for sealing the same; and manually releasable latch means for retaining said handle assembly in said first position for ironing; the improvement which comprises means distinct from said guard plate for mounting said valve on said base for swinging movement between a first position in which said valve closes said opening, and a second position in which the valve is removed from said opening to permit filling access thereto; spring means urging said valve mounting means towards its second position; and cooperating means on said valve mounting means and said guard plate for smoothly engaging each other during movement of said handle assembly towards its first position and for simultaneously moving said valve mounting means to its first position in response to said handle assembly movement.

6. In a steam iron having a base including a sole plate and a boiler mounted above the sole plate, said boiler having an upper filler opening; a handle assembly including a guard plate movably mounted on said base to move between the first position overlying said opening in which the same is covered by said guard plate, and a second position remote from said opening to expose the same for filling; a valve cooperable with said opening for sealing the same; and manually releasable latch means for retaining said handle assembly in said first position for ironing; the improvement which comprises means distinct from said guard plate for mounting said valve on said base for swinging movement between a first position in which said valve closes said opening, and a second position in which the valve is removed from said opening to permit filling access thereto; and an articulated linkage connected at one end to move said valve mounting means and at the other to said guard plate for moving said valve mounting means to its second position when said handle assembly is moved to its second position and to its first position when said handle assembly is moved to its first position.

7. In a steam iron having a base including a sole plate and a boiler mounted above the sole plate, said boiler having an upper filler opening; a handle assembly including a guard plate movably mounted on said base to move between a first position overlying said opening in which the same is covered by said guard plate, and a second position remote from said opening to expose the same for filling; a valve cooperable with said opening for sealing the same; means for mounting said valve on said base and operative when said handle assembly is moved to cause movement of said valve between a position in which said valve closes said opening and a position in which the valve is removed from said opening to permit filling access thereto; the improvement which comprises means connected with the handle assembly and valve, providing slow initial removing movement of said valve in response to quicker movement of the handle assembly from its first to its second positions.

8. In a steam iron having a base including a sole plate and a boiler mounted above the sole plate, said boiler having an upper filler opening; a handle assembly including a guard plate movably mounted on said base to move between a first position overlying said opening in which the same is covered by said guard plate, and a second position remote from said opening to expose the same for filling; a valve cooperable with said opening for sealing the same; means for mounting said valve on said base and operative when said handle assembly is moved to cause movement of said valve between a position in which said valve closes said opening and a position in which the valve is removed from said opening to permit filling access thereto; and manually releasable latch means for retaining said handle assembly in said first position for ironing; the improvement which comprises a standpipe covering dome projecting upwardly from the upper surface of said boiler and having an undercut configuration forming one portion of said latch means; a latch plate slidably mounted on the undersurface of said guard plate for movement into and out of engagement with the undercut portion of said dome and constituting another portion of said latch means; and an operating button having a head movable adjacent the top surface of said guard plate and having a neck passing through an opening in said guard plate, said neck having means thereon for retaining said latch plate in sliding engagement with the undersurface of said guard plate.

9. In a steam iron having a base including a sole plate and a boiler mounted above the sole plate, said boiler having an upper filler opening; a handle assembly including a guard plate movably mounted on said base to move between a first position overlying said opening in which the same is covered by said guard plate, and a second position remote from said opening to expose the same for filling; a valve cooperable with said opening for sealing the same; means for mounting said valve on said base and operative when said handle assembly is moved to cause movement of said valve between a position in which said valve closes said opening and a position in which the valve is removed from said opening to permit filling access thereto; and manually releasable latch means for retaining said handle assembly in said first position for ironing; the improvement which comprises a standpipe covering dome projecting upwardly from the upper surface of said boiler and having an undercut configuration forming one portion of said latch means; a latch plate slidably mounted on the undersurface of said guard plate for movement into and out of engagement with the undercut portion of said dome and constituting another portion of said latch means; and an operating button having a head rotatable adjacent the top surface of said guard plate and having a neck rotatably received in an opening in said guard plate, said neck having a member attached to the lower end thereof, said member underlying said latch plate and being mechanically interconnected therewith simultaneously to support said latch plate for sliding movement against the lower surface of said guard plate and to reciprocate the latch plate into and out of latching engagement with the undercut portion of said dome in response to rotation of said head.

10. In a steam iron having a base including a sole plate and a boiler mounted above the sole plate, said boiler having an upper filler opening; a handle assembly including a guard plate movably mounted on said base to move between a first position overlying said opening in which the same is covered by said guard plate, and a second position remote from said opening to expose the same for filling; a valve cooperable with said opening for sealing the same; means for mounting said valve on said base and operative when said handle assembly is moved to cause movement of said valve between a position in which said valve closes said opening and a position in which the valve is removed from said opening to permit filling access thereto; and manually releasable latch means for retaining said handle assembly in said first position for ironing; the improvement which comprises a standpipe covering dome projecting upwardly from the upper surface of said boiler and having an undercut configuration forming one portion of said latch means; a sheet metal latch plate slidably mounted on the undersurface of said guard plate for movement into and out of engagement with the undercut portion of said dome and constituting another portion of said latch means; and an operating button having a head rotatable adjacent the top surface of said guard plate and having a neck rotatably received in an opening in said guard plate, said neck having a cam member attached to the lower end thereof, said member underlying said latch plate and being mechanically interconnected therewith by a follower lanced from said latch plate simultaneously to support said latch plate for sliding movement against the lower surface of said guard plate and to reciprocate the latch plate into and out of latching engagement with the undercut portion of said dome in response to rotation of said head.

11. In a steam iron having a base including a sole plate and a boiler mounted above the sole plate, said boiler having an upper filler opening; a molded plastic handle assembly including an integrally molded guard plate movably mounted on said base to move between a first position overlying said opening in which the same is covered by said guard plate, and a second position remote from said opening to expose the same for filling; a valve cooperable with said opening for sealing the same; means for mounting said valve on said base and operative when said handle assembly is moved to cause movement of said valve between a position in which said valve closes said opening and a position in which the valve is removed from said opening to permit filling access thereto; and manually releasable latch means for retaining said handle assembly in said first position for ironing; the improvement which comprises a standpipe covering dome projecting upwardly from the upper surface of said boiler and having an undercut configuration forming one portion of said latch means; a sheet metal latch plate slidably mounted on the undersurface of said guard plate for movement into and out of engagement with the undercut portion of said dome and constituting another portion of said latch means; an operating button having a head rotatable adjacent the top surface of said guard plate and having a neck rotatably received in an opening in said guard plate, said neck having a cam member attached to the lower end thereof, said member underlying said latch plate and being mechanically interconnected therewith by a follower lanced from said latch plate simultaneously to support said latch plate for sliding movement against the lower surface of said guard plate and to reciprocate the latch plate into and out of latching engagement with the undercut portion of said dome in response to rotation of said head; and guide means integrally molded on the bottom surface of said guard plate and engaging opposite edges of said latch plate to restrict the movement of the same to a linear path.

12. In a steam iron having a base including a sole plate and a boiler mounted above the sole plate, said boiler having an upper filler opening; a molded plastic handle assembly including an integrally molded guard plate movably mounted on said base to move between a first position overlying said opening in which the same is covered by said guard plate, and a second position remote from said opening to expose the same for filling; a valve cooperable with said opening for sealing the same; means for mounting said valve on said base and operative when said handle assembly is moved to cause movement of said valve between a position in which said valve closes said opening and a position in which the valve is removed from said opening to permit filling access thereto; and manually releasable latch means for retaining said handle assembly in said first position for ironing; the improvement which comprises a latch plate slidably mounted on the undersurface of said guard plate for movement into and out of engagement with a base mounted portion of said latch means and constituting another portion of said latch means; and guide means integrally molded on the bottom surface of said guard plate and engaging opposite edges of said latch plate to restrict the movement of the same to a linear path.

13. In a steam iron having a base including a sole plate and a boiler mounted above the sole plate, said boiler having an upper filler opening; a handle assembly including a guard plate movably mounted on said base to move between a first position overlying said opening in which the same is covered by said guard plate, and a second position remote from said opening to expose the same for filling; a valve cooperable with said opening for sealing the same; means for mounting said valve on said base and operative when said handle assembly is moved to cause movement of said valve between a position in which said valve closes said opening and a position in which the valve is removed from said opening to permit filling access thereto; and manually releasable latch means for retaining said handle assembly in said first position for ironing; the improvement which comprises a standpipe covering dome projecting upwardly from the upper surface of said boiler and having an undercut configuration forming one portion of said latch means; a latch member slidably mounted on the undersurface of said guard plate for movement into and out of engagement with the undercut portion of said dome and constituting another portion of said latch means; and an operating button having a head slidable adjacent the upper surface of said guard plate and having a neck slidably received in a slot in said guard plate and operatively connected to said latch member; and spring means urging said latch member to extended position in the direction for engagement with said dome when the handle assembly is in said first position.

14. In a steam iron having a base including a sole plate and a boiler mounted above the sole plate, said boiler having an upper filler opening; a handle assembly including a guard plate movably mounted on said base to move between a first position overlying said opening in which the same is covered by said guard plate, and a second position remote from said opening to expose the same for filling; a valve cooperable with said opening for sealing the same; means for mounting said valve on said base and operative when said handle assembly is moved to cause movement of said valve between a position in which said valve closes said opening and a position in which the valve is removed from said opening to permit filling access thereto; and manually releasable latch means for retaining said handle assembly in said first position for ironing; the improvement which comprises a standpipe covering dome of upwardly tapering configuration projecting upwardly from the upper surface of said boiler and having an undercut configuration forming one portion of said latch means; a latch member slidably mounted on the undersurface of said guard plate for movement into and out of engagement with the undercut portion of said dome and constituting another portion of said latch means; and an operating button having a head slidable adjacent the upper surface of said guard plate and having a neck slidably received in a slot in said guard plate and operatively connected to said latch member; and spring means urging said latch member to extended position in the direction for engagement with said dome when the handle assembly is in said first position, said latch in extended position being located to strike the tapering surface of said dome during movement of said handle assembly towards said first position whereby the latch is automatically retracted and snaps into latching relationship to the undercut portion of said dome in response to movement of said handle assembly into said first position.

15. In a steam iron having a base including a sole plate and a boiler mounted above the sole plate, said boiler having an upper filler opening; a handle assembly including a guard plate movably mounted on said base to move between a first position overlying said opening in which the same is covered by said guard plate, and a second position remote from said opening to expose the same for filling; a valve cooperable with said opening for sealing the same; means for mounting said valve on said base and operative when said handle assembly is moved to cause movement of said valve between a position in which said valve closes said opening and a position in which the valve is removed from said opening to permit filling access thereto; and manually releasable latch means for retaining said handle assembly in said first position for ironing; the improvement which comprises a standpipe covering dome projecting upwardly from the upper surface of said boiler and having an undercut configuration forming one portion of said latch means; a latch plate slidably mounted on the undersurface of said guard plate for movement into and out of engagement with the undercut portion of said dome and constituting another portion of said latch means; and an operating button having a head slidable adjacent the upper surface of said guard plate and having a neck slidably received in a slot in said guard plate and operatively connected to said latch plate; abutment means connected to and extending from the underside of said guard plate; and a leaf spring secured to said latch plate and reacting against said abutment means for urging said latch member to extended position in the direction for engagement with said dome when the handle assembly is in said first position.

References Cited in the file of this patent

UNITED STATES PATENTS

| Number | Name | Date |
| --- | --- | --- |
| 2,475,571 | Schreyer | July 5, 1949 |
| 2,475,572 | Schreyer | July 5, 1949 |